July 17, 1956 — L. A. RUBEN — 2,754,715
ROW INDICATOR FOR ACCORDIONS
Filed Jan. 8, 1952
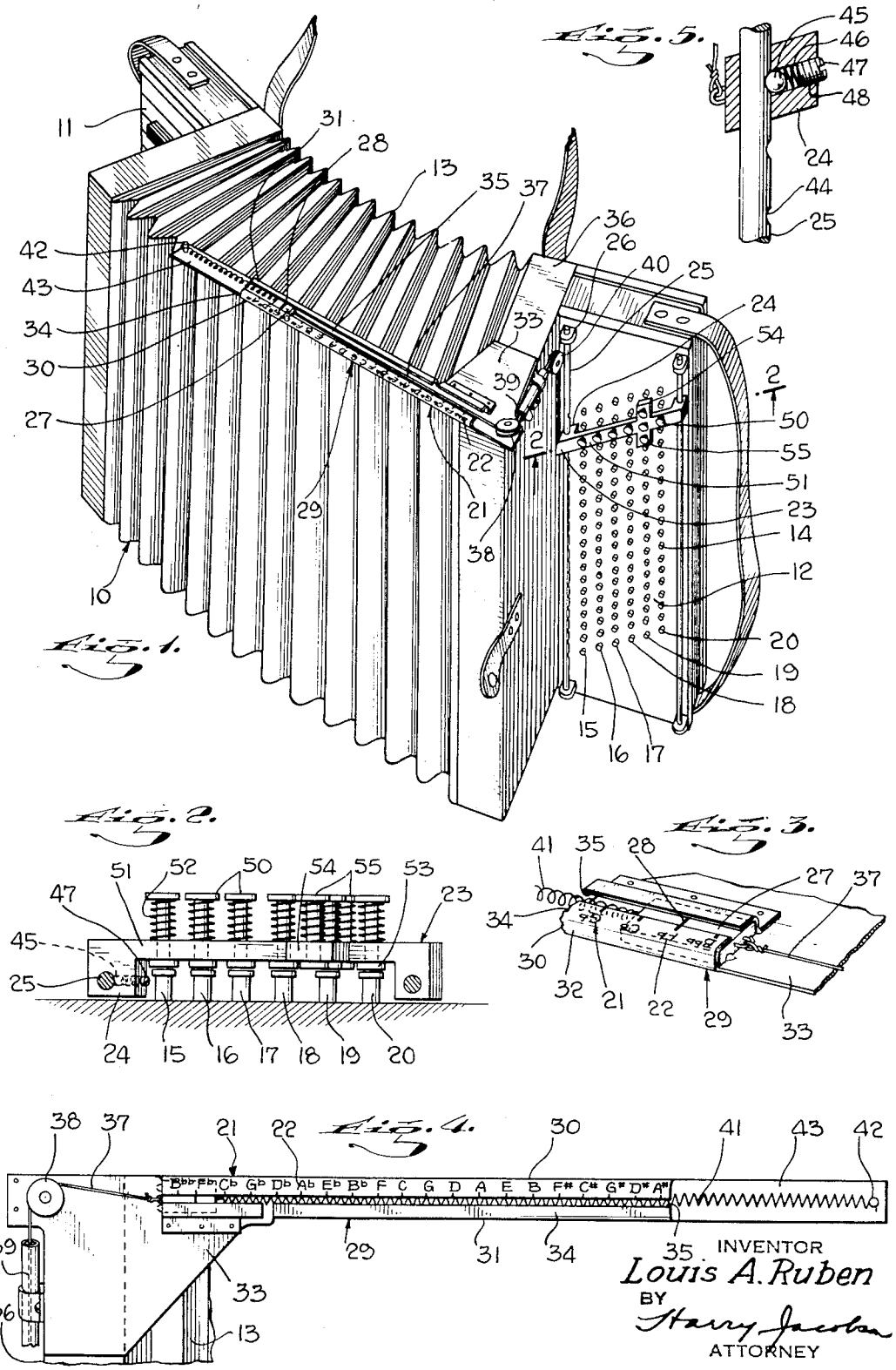
INVENTOR
Louis A. Ruben
BY
Harry Jacobs
ATTORNEY

United States Patent Office 2,754,715
Patented July 17, 1956

2,754,715

ROW INDICATOR FOR ACCORDIONS

Louis A. Ruben, Bayonne, N. J.; Charlotte Ruben, executrix of said Louis A. Ruben, deceased Application January 8, 1952, Serial No. 265,368

1 Claim. (Cl. 84—442)

This invention relates to accordions, and particularly to row indicating means for the bass keyboard thereof.

Considerable difficulty has been experienced by accordion players in locating in the bass keyboard the proper row of buttons which includes that button controlling the chord accompaniment to be played by the left hand. Conventional accordions have about twenty lines or rows of six buttons each in the bass keyboard which faces away from the player and therefore is normally concealed from the player. Orientation of the left hand with respect to and selection of any of the twenty rows of buttons consequently requires long practice and great skill not ordinarily attained by prospective players of the instrument.

The present invention therefore contemplates the provision of an indicator which apprises the player at all times of the position of a key-carrying slide movable in front of the bass keyboard into position to select and to permit operation of any row of buttons.

The invention further contemplates the provision of a slide provided with a set of keys for operating any selected button of a row, the slide being readily movable by the left hand of the player to any required row in much the same manner as the row is conventionally selected, the slide having an operative connection to an indicator movable along a scale bearing symbols constituting the root names of the chords of the various rows and thereby indicating to the player the row at which the slide is located or to which it has been moved.

The invention further contemplates the provision of an indicator so designed that the player need only move a key-carrying slide until the indicator mark is at the symbol of a scale designating the desired chord row, whereby the selected button may be pressed through the proper key on the slide with the knowledge and assurance that the chord or note played is the correct one corresponding to the designated symbol or indication.

The various objects of the invention will be clear from the description which follows and from the drawings in which Fig. 1 is a perspective view of an accordion showing the row indicator applied thereto.

Fig. 2 is a horizontal fragmentary sectional view of the bass keyboard showing the operating slide, the section being taken on the line 2—2 of Fig. 1.

Fig. 3 is a fragmentary enlarged perspective view of the sliding indicator or marker and of the scale-bearing guide therefor.

Fig. 4 is a top plan view of the scale and the row indicator.

Fig. 5 is a fragmentary vertical sectional view of the slide and of one of the guides therefor, showing the detent means thereof.

In the practical embodiment of the invention shown by way of example, the accordion 10 may be of any of the standard or conventional types having the usual piano keyboard 11, the bass keyboard 12 and the intermediate bellows 13. As shown, the bass keyboard comprises twenty rows as 14 of six buttons each. The corresponding buttons of each row are designated herein by the same numeral as 15, 16, 17, 18, 19 and 20 controlling respectively the counterbass and bass notes as well as the various chords of the particular root, such as the major, minor, seventh and diminished chords of the root chords shown by the scale 21 of symbols 22.

As has been indicated, means are provided for designating on the row or scale 21 the position of the button operating slide 23 at all times. Said slide has a rearward extension 24 at each end thereof slidably mounted on a fixed upright guide as 25 secured to the keyboard 12 as by means of the brackets 26, whereby the slide may easily be reciprocated bodily and vertically by the left hand of the player along the front of the keyboard to a position in front of any row 14 of buttons. Such movement of the slide is transmitted, in any suitable manner, to the sliding indicator or marker 27 having the transverse indicating line 28 thereon. The marker 27 is mounted for movement along the scale 21 of symbols in any suitable manner, as by means of the guide 29 having opposed flanges 30, 31 in part upstanding as at 32 from the base 33 and in part horizontal as at 34 and extending part way toward the horizontal part of the other flange. The flanges 30 and 31 thereby provide between them the groove 35 in which the marker is inserted and slides, the line 28 of the marker being visible through the space between the horizontal parts 34 of the flanges. The row or scale 21 is marked on one of the flanges 34 the symbols 22 being spaced apart distances corresponding to the spacing of the rows 14 of buttons. The base 33 of the indicating means is suitably secured to any relatively rigid part of the accordion, such as the end wall 36 of the bellows, in position sufficiently removed from the player so that the scale 21 and marker 27 are clearly visible during the playing operation.

To connect the slide 23 operatively to the marker 27, one end of the flexible cable 37 is secured to the slide and the other end secured to the marker. The cable passes around the pulley 38 on the base 33, through the guide tube 39 on the wall 36 and around the pulley 40 on said wall 36. Consequently, vertical movement of the slide on its guide rods 25 moves the marker 27 in its guide groove 35 and along the scale 21. To insure movement of the marker when the slide is moved upwardly, one end of the tension spring 41 is secured to a fixed pin as 42 upstanding from the extension 43 of the base 33 while the other end of the spring is secured to the marker. The spring maintains the cable stretched and taut, upward movement of the slide permitting the spring to contract and downward movement elongating the spring. Obviously the length of the cable can readily be made such that the line 28 of the marker is always at that symbol 22 which designates the row at which the slide is located at any moment.

Means are provided for resisting movement of the slide 23 out of its position in front of each row. As best seen in Fig. 5 such detent means comprises a series of partly spherical recesses 44 in the guide rod 25, the recesses being spaced apart the same distances as the rows 14 and each being adapted to receive the ball 45 removably as said ball slides along the rod together with the slide 23 as a unit. The spring 46 in the slide extension 24 urges the ball into pressed contact with the guide rod, the spring being held in place by the set-screw 47 screwed into the threaded hole 48 of the extension. When the ball reaches a recess 44, it enters the recess and thereafter resists movement of the slide, the amount of resistance being adjustable. The player feels such resistance to movement and knows that the slide is located properly in front of a row of buttons, but nevertheless can move the slide past the row by exerting a slightly greater force than that required to move the slide between recesses, thereby to cam the ball out of the recess 44.

Carried by the slide 23 is a row of six button-operating spaced apart keys 50 arranged respectively to register with the buttons 15, 16, 17, 18, 19 and 20 when the detent ball is in a recess 44 and selectively to operate said buttons of the particular row selected by the movement of the slide. Each key 50 is mounted for axial reciprocation in the cross bar 51 of the slide and is normally maintained in an extended position out of contact with the buttons by the spring 52 around the shaft of the key outside of the cross bar and acting on the enlarged head of the key. The collar 53 on the key shaft inside of the cross bar limits the outward movement of the key. While the slide is shown as carrying a single row of keys 50, it may obviously be made wide enough to cover two or more rows if it is desired to lessen the amount of movement thereof and to carry two or more rows of keys. In the form illustrated in Fig. 1, the cross bar 51 is widened as at 54 only at the buttons 18 to cover three such buttons in three consecutive rows 14 and to carry the auxiliary keys 55 thereby to avoid movement of the slide when the music calls for operation of the corresponding buttons of adjacent rows consecutively.

It will now be seen that by reason of the coaction of the slide 23 and the marker 27 and of the connections therebetween, movement of the slide causes corresponding movement of the marker over the row-indicating scale 21. Thereby the player can tell which row 14 of buttons will be operated on the operation of the keys 50 or 55 of the slide without guessing, delay, uncertainty or possibility of error and without the need for contortions on the part of the player which might otherwise be necessitated by an attempt to look at the bass keyboard while playing the accordion. The playing of accompaniments on the accordion is consequently made possible by players of little skill, who could not play the instrument properly by present methods or without the row indicator of this invention. It will also be seen that the indicator may be made either in the form of an attachment to be secured to a conventional accordion, or as an integral part of the musical instrument, and is simple, inexpensive, easy to operate and effective to accomplish its intended purposes.

While a certain specific form of the invention has herein been shown and described, it will be obvious that various changes in structure may be made therein without departing from the spirit of the invention defined by the appended claim.

I claim:

The combination including an accordion having a substantially vertical, forwardly directed keyboard provided with a plurality of longitudinally spaced rows of transversely spaced apart buttons, a slide member longitudinally movable along a path overlying said buttons and adapted to be brought into registry with a selected row of said buttons, depressible keys carried on said slide and adapted to engage selected buttons in said rows, a substantially horizontal, longitudinally extending plate mounted on the upper part of said accordion and having indicia on its upwardly directed face, a pointer slidable along said plate and movable between an advanced and a retracted position, spring means urging said pointer towards its retracted position, and a flexible line engaging said pointer and said slide whereby movement of said slide is accompanied by a corresponding movement of said pointer.

References Cited in the file of this patent

UNITED STATES PATENTS

| | | |
|---|---|---|
| 276,682 | Guernsey | May 1, 1882 |
| 397,877 | Sylvan | Feb. 12, 1889 |
| 590,631 | Schneider | Sept. 28, 1897 |
| 961,120 | Goliasch | June 14, 1910 |
| 1,172,931 | Brown | Feb. 22, 1916 |
| 1,173,640 | Barrett | Feb. 29, 1916 |
| 1,246,186 | Thomas | Nov. 13, 1917 |
| 1,613,400 | McAleavey | Jan. 4, 1927 |
| 1,696,901 | Bostelman, Jr. | Jan. 1, 1929 |
| 2,257,060 | Moilliet | Sept. 23, 1941 |

FOREIGN PATENTS

| | | |
|---|---|---|
| 379,706 | Germany | Aug. 27, 1923 |
| 398,985 | Great Britain | Sept. 28, 1933 |